(12) United States Patent
Oe (10) Patent No.: US 8,279,538 B2
(45) Date of Patent: Oct. 2, 2012

(54) LENS SYSTEM

(75) Inventor: Kazuhiro Oe, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 171 days.

(21) Appl. No.: 12/913,386

(22) Filed: Oct. 27, 2010

(65) Prior Publication Data
US 2011/0102906 A1    May 5, 2011

(30) Foreign Application Priority Data

Oct. 30, 2009 (JP) .................................. 2009-249981

(51) Int. Cl.
*G02B 9/34* (2006.01)
(52) U.S. Cl. ........................................................ 359/774
(58) Field of Classification Search .................. 359/687, 359/774
See application file for complete search history.

(56) References Cited

U.S. PATENT DOCUMENTS 6,940,656 B2 *  9/2005  Oomura et al. ............... 359/687

FOREIGN PATENT DOCUMENTS

| JP | 2003-121737 | 4/2003 |
| JP | 2006-003589 | 1/2006 |

* cited by examiner

*Primary Examiner* — Joseph P Martinez
(74) *Attorney, Agent, or Firm* — Thompson Hine LLP (57) ABSTRACT

A lens system includes, in order from an object side, a first lens group with positive refractive power, a second lens group with negative refractive power that moves during zooming, a third lens group with positive refractive power, and a fourth lens group with positive refractive power that moves during zooming and focusing adjustments. The first lens group includes a lens with positive refractive power and an Abbe number vd1$x$ that satisfies a following condition (vd1$x$>80). The second lens group includes a lens with positive refractive power and an Abbe number vd2$x$ and two lenses with negative refractive power and Abbe numbers vd2$y$ and vd2$z$ respectively, the Abbe numbers Vd2$x$, Vd2$y$ and Vd2$z$ satisfying following conditions (vd2$x$, vd2$y$, vd2$z$<23). The third lens group includes a plurality of lenses with positive refractive power, an average vd3$a$ of the Abbe numbers of the plurality of lenses with positive refractive power satisfies a following condition (77.5<vd3$a$<82.5), and a sum ndts of thermo-optical coefficients of the plurality of lenses with positive refractive power in a temperature range of 40° C. to 60° C. satisfies a following condition ($-12.8 \times 10^{-6}$<ndts<$-2.4 \times 10^{-6}$).

10 Claims, 4 Drawing Sheets

| | Ri | Di | nd | vd | φi | | Focal distance |
|---|---|---|---|---|---|---|---|
| Object plane | | | | | | | Group |
| 1 | 26.33 | 3.30 | 1.74320 | 49.3 | 20.8 | Lens L11 | |
| 2 | 82.32 | 0.21 | | | 19.7 | | 43.79 |
| 3 | 29.57 | 0.80 | 1.72047 | 34.7 | 18.7 | Lens L12 | |
| 4 | 14.50 | 4.85 | 1.43875 | 95.0 | 17.5 | Lens L13 | |
| 5 | 196.11 | V1 | | | 16.8 | | |
| 6 | 18.41 | 4.40 | 1.92286 | 18.9 | 13.4 | Lens L21 | |
| 7 | 154.72 | 0.80 | 1.80809 | 22.8 | 10.6 | Lens L22 | |
| 8 | 12.25 | 1.37 | | | 9.0 | | |
| 9 | -31.75 | 0.80 | 1.80809 | 22.8 | 8.8 | Lens L23 | -12.20 |
| 10 | 11.84 | 1.58 | | | 8.1 | | |
| 11 | -14.62 | 0.80 | 1.56732 | 42.8 | 8.0 | Lens L24 | |
| 12 | 14.62 | 2.39 | 1.92286 | 18.9 | 8.2 | Lens L25 | |
| 13 | -52.38 | V2 | | | 8.2 | | |
| 14 | Inf | 1.20 | | | 13.4 | Stop S | |
| 15 | 17.05 | 3.59 | 1.51633 | 64.1 | 14.3 | Lens L31 | |
| 16 | -35.38 | 0.21 | | | 14.5 | | |
| 17 | 14.12 | 5.97 | 1.43875 | 95.0 | 14.4 | Lens L32 | 22.82 |
| 18 | -16.28 | 0.20 | | | 13.5 | | |
| 19 | 98.49 | 0.80 | 1.76182 | 26.5 | 11.4 | Lens L33 | |
| 20 | 8.56 | V3 | | | 10.0 | | |
| 21 | 12.95 | 2.75 | 1.72916 | 54.7 | 9.7 | Lens L41 | 16.81 |
| 22 | -207.65 | V4 | | | 9.5 | | |
| Image plane | | | | | | | |

Fig. 3

(a)
| | WIDE | TELE |
|---|---|---|
| Focal Distance | 15.45 | 53.35 |
| Fno. | 1.44 | 2.70 |
| Back focus (in Air) | 11.41 | 7.35 |
| Total lens length (in Air) | 69.32 | |
| Image height | 3.30 | |

(b)
| Di | WIDE | TELE |
|---|---|---|
| 5 (V1) | 0.80 | 14.70 |
| 13 (V2) | 14.70 | 0.80 |
| 20 (V3) | 6.93 | 10.45 |
| 22 (V4) | 11.41 | 7.35 |

| | Ri | Di | nd | vd | φi | | Focal distance |
|---|---|---|---|---|---|---|---|
| Object Plane | | | | | | | Gruop |
| 1 | 28.62 | 3.02 | 1.74320 | 49.3 | 22.0 | Lens L11 | |
| 2 | 72.00 | 0.20 | | | 21.2 | | 46.48 |
| 3 | 31.63 | 0.90 | 1.72047 | 34.7 | 20.5 | Lens L12 | |
| 4 | 16.20 | 4.72 | 1.43875 | 95.0 | 19.2 | Lens L13 | |
| 5 | 5073.73 | V1 | | | 18.5 | | |
| 6 | 14.78 | 3.76 | 1.94595 | 17.9 | 13.5 | Lens L21 | |
| 7 | 23.88 | 1.03 | 1.92286 | 18.9 | 11.0 | Lens L22 | |
| 8 | 10.84 | 1.61 | | | 9.5 | | |
| 9 | −34.72 | 0.80 | 1.80809 | 22.8 | 9.3 | Lens L23 | −13.26 |
| 10 | 12.47 | 1.60 | | | 8.6 | | |
| 11 | −18.02 | 0.89 | 1.54814 | 45.7 | 8.6 | Lens L24 | |
| 12 | 14.78 | 2.41 | 1.94595 | 17.9 | 9.0 | Lens L25 | |
| 13 | −87.37 | V2 | | | 9.0 | | |
| 14 | Inf | 1.20 | | | 14.0 | Stop S | |
| 15 | 16.85 | 3.35 | 1.59201 | 67.0 | 15.0 | Lens L31 | |
| 16 | −67.06 | 0.20 | | | 15.0 | | |
| 17 | 13.29 | 5.76 | 1.43875 | 95.0 | 14.8 | Lens L32 | 22.33 |
| 18 | −19.79 | 0.20 | | | 13.8 | | |
| 19 | 57.27 | 0.80 | 1.76182 | 26.5 | 11.7 | Lens L33 | |
| 20 | 8.45 | V3 | | | 10.2 | | |
| 21 | 13.20 | 2.49 | 1.72916 | 54.7 | 9.6 | Lens L41 | 18.39 |
| 22 | 773.02 | V4 | | | 9.1 | | |
| Image plane | | | | | | | |

|  | WIDE | TELE |
|---|---|---|
| Focal Distance | 15.45 | 53.35 |
| Fno. | 1.44 | 2.52 |
| Back focus (in Air) | 11.38 | 7.32 |
| Total lens length (in Air) | 69.31 | |
| Image height | 3.30 | |

(b)

| Di |  | TELE |
|---|---|---|
| 5 (V1) | 0.80 | 16.24 |
| 13 (V2) | 16.24 | 0.80 |
| 20 (V3) | 9.06 | 5.00 |
| 22 (V4) | 11.38 | 7.32 |

(c)

| S15 | |
|---|---|
| K | 0.5789 |
| A | -1.01E-04 |
| B | 5.36E-07 |
| C | -2.67E-08 |
| D | 1.64E-10 |
| E | — |
| F | — |
| S16 | |
| K | -5.914 |
| A | 1.99E-05 |
| B | 1.03E-06 |
| C | -2.97E-08 |
| D | 2.44E-10 |
| E | — |
| F | — |

LENS SYSTEM

CROSS-REFERENCE TO RELATED APPLICATIONS

This application is based upon and claims the benefit of priority from the prior Japanese Patent Application No. 2009-249981, filed Oct. 30, 2009, the entire contents of which are incorporated herein by reference.

BACKGROUND

The present invention relates to a lens system suited to forming images using visible light and near-infrared light.

Japanese Laid-Open Patent Publication No. 2003-121737 discloses the provision of a master focus (rear focus)-type four-group zoom lens with a bright f number, a high zoom ratio, and high optical performance across the entire zoom range. The zoom lens disclosed in this Publication is disclosed as being composed, in order from the object side, of a first lens group with positive refractive power, a second lens group with negative refractive power, a third lens group with positive refractive power, and a fourth lens group with positive refractive power, with the first and third lens groups being fixed. The third lens group is composed of a single positive lens and has at least one aspherical surface. The second lens group is moved in one direction to change the magnification (i.e., "zoom"), and the fourth lens group is moved non-linearly to correct movement of the image plane that accompanies zooming and is moved toward the subject to shift the focus from a subject at infinity to a subject at close range. The publication also states that the fourth group is composed of two positive lenses and one negative lens, and that the zoom lens is composed of a total of ten lenses.

Japanese Laid-Open Patent Publication No. 2006-3589 discloses a varifocal lens that has a high zoom ratio and is capable of achieving high optical performance across the entire zoom range for light of the visible range to the near-infrared range. In the lens disclosed in this Publication, a positive first group, a negative second group, a positive third group, and a positive fourth group are disposed in that order from the object side. The publication additionally states that when zooming from the wide-angle end to the telephoto end, the first group and the third group are fixed on the optical axis, the second group is moved along the optical axis toward the image to change the magnification, and the fourth group is independently moved along the optical axis to correct movement of the image plane that accompanies the zooming. In order from the object side, the first group is composed of a cemented lens composed of negative and positive lenses and a positive lens, the second group is composed of a negative lens and a cemented lens composed of negative and positive lenses, the third group is composed of a cemented lens composed of positive and negative lenses, and the fourth group is composed of a positive lens, a negative lens and a positive lens, where at least one surface is aspherical.

A telephoto type lens system with four groups in a positive, negative, positive, and positive arrangement is often used as a lens system for monitoring applications. Due to the increasingly high performance of image pickup elements in recent years, higher resolution is now demanded for such lens systems for monitoring applications. To achieve higher resolution, favorable correction of axial chromatic aberration and chromatic aberration of magnification is important. Telephoto lenses that are important for monitoring purposes tend to have high axial chromatic aberration compared to wide-angle lenses. To realize day and night operation, it is also necessary to thoroughly suppress axial chromatic aberration for the range of visible wavelengths and near-infra red wavelengths, for example, up to a wavelength range of 800 to 900 nm. On the other hand, it is necessary to lower the F number to achieve bright images, which makes it difficult to increase the depth of focus.

In monitoring applications, there is demand for a lens system that does not have an autofocus mechanism or a motorized focusing mechanism and also does not have a motorized zoom mechanism. There is also demand for such a lens system to be bright and to have little axial chromatic aberration.

SUMMARY

One aspect of the present invention is a lens system comprising, in order from an object side (subject side): a first lens group with positive refractive power; a second lens group with negative refractive power that moves during zooming; a third lens group with positive refractive power; and a fourth lens group with positive refractive power that moves during zooming and focusing adjustments. The first lens group includes a lens with positive refractive power and an Abbe number $vd1x$ that satisfies Condition (1) below. The second lens group includes a lens with positive refractive power and an Abbe number $vd2x$ and two lenses with negative refractive power and Abbe numbers $vd2y$ and $vd2z$ respectively. The Abbe numbers $vd2x$, $vd2y$ and $vd2z$ satisfy Condition (2) below. In addition, the third lens group includes a plurality of lenses with positive refractive power, wherein an average $vd3a$ of the Abbe numbers and a sum $ndts$ of thermo-optical coefficients in a temperature range of 40 to 60° C. of the plurality of lenses with positive refractive power respectively satisfy Conditions (3) and (4) below.

$$vd1x > 80 \tag{1}$$

$$vd2x, vd2y, vd2z < 23 \tag{2}$$

$$77.5 < vd3a < 82.5 \tag{3}$$

$$-12.8 \times 10^{-6} < ndts < -2.4 \times 10^{-6} \tag{4}$$

Another aspect of the present invention is a lens system consisting, in order from an object side (subject side): a first lens group with positive refractive power; a second lens group with negative refractive power that moves during zooming; a third lens group with positive refractive power; and a fourth lens group with positive refractive power that moves during zooming and focusing adjustments. The first lens group includes a lens with positive refractive power and an Abbe number $vd1x$ that satisfies Condition (1) below. The second lens group includes a lens with positive refractive power and an Abbe number $vd2x$ and two lenses with negative refractive power and Abbe numbers $vd2y$ and $vd2z$ respectively. The Abbe numbers $vd2x$, $vd2y$ and $vd2z$ satisfy Condition (2) below. In addition, the third lens group includes a plurality of lenses with positive refractive power, wherein an average $vd3a$ of the Abbe numbers and a sum $ndts$ of thermo-optical coefficients in a temperature range of 40 to 60° C. of the plurality of lenses with positive refractive power respectively satisfy Conditions (3) and (4) below.

$$vd1x > 80 \tag{1}$$

$$vd2x, vd2y, vd2z < 23 \tag{2}$$

$$77.5 < vd3a < 82.5 \tag{3}$$

$$-12.8 \times 10^{-6} < ndts < -2.4 \times 10^{-6} \tag{4}$$

In this lens system, according to Conditions (1) and (2), it is possible to correct chromatic aberration and achieve a sufficient zoom ratio with a compact configuration. Also, based on Conditions (3) and (4), the third lens group is constructed so as to include a plurality of low dispersion lenses with positive refractive power, which means that a positive refractive power can be achieved while suppressing the production of chromatic aberration. In addition, by using a lens made of glass with a negative thermo-optical coefficient, variations in refractive power due to the temperature of the entire lens system are suppressed.

That is, the thermo-optical coefficient of many optical materials is positive (plus), and when a group with positive power and a group with negative power are combined, focusing fluctuations due to variations in system temperature are often cancelled out. In the present lens system, by using four lens groups that have positive, negative, positive, and positive refractive powers and making the thermo-optical coefficient of the third lens group negative, in addition to the combination of positive and negative powers, a combination of positive and negative thermo-optical coefficients for groups with positive refractive power is consisted, it is possible to further suppress the thermo-optical coefficient of the lens system through the use of. Accordingly, it is possible to provide a lens system that can be applied to an image pickup apparatus that may does not have an autofocus mechanism or a motorized focusing mechanism.

Lenses made of low-dispersion (i.e., high Abbe number) optical materials that go by the names of "ED glass", "SD glass", "LD glass", "UD glass", and the like and exhibit anomalous dispersion are used to favorably correct chromatic aberration, with such materials including materials that have large, negative thermo-optical coefficients. Accordingly, by constructing the third lens group so as to include a plurality of positive lenses with high Abbe numbers, there is the effect of correcting chromatic aberration due to the low dispersion, with it also being possible to design the group as a lens group with a negative thermo-optical coefficient and an appropriate positive refractive power. In addition, by using a plurality of lenses, it is possible to improve the aberration correction performance of the third lens group.

The sum ndts of the thermo-optical coefficients of the plurality of lenses with positive refractive power in the third lens group should preferably satisfy Condition (5) below.

$$-8.6 \times 10^{-6} < ndts < -2.4 \times 10^{-6} \quad (5)$$

The plurality of lenses with positive refractive power in the third lens group may include one or more lenses with negative thermo-optical coefficients. Also, the plurality of lenses with positive refractive power in the third lens group may include lenses with both positive and negative thermo-optical coefficients. A typical third lens group is composed of two lenses with positive refractive power and one lens with negative refractive power.

The second lens group preferably includes a cemented lens that includes the lens with positive refractive power and one of the two lenses with negative refractive power. This is effective in correcting axial chromatic aberration.

The Abbe number vd1x of the lens with positive refractive power in the first lens group preferably satisfies Condition (6) below. By doing so, it is possible to further suppress the production of axial chromatic aberration and chromatic aberration of magnification.

$$vd1x > 90 \quad (6)$$

Also, the first lens group preferably includes a cemented lens that includes the lens with positive refractive power and a lens with negative refractive power.

In the above lens system, substantially favorable correction of chromatic aberration is achieved by the first to third lens groups, and the fourth lens group that is mainly used for focusing may have a simple construction that includes only lenses with positive refractive power. A typical fourth lens group is constructed of a single lens with positive refractive power.

Another aspect of the present invention is an image pickup (imaging) apparatus including the lens system described above and an image pickup element. After the zoom position has been set, obtaining brighter and sharper images may possible without carrying out focusing adjustments using an autofocus mechanism or the like. This makes the image pickup apparatus suited to an apparatus used for monitoring during the day and night.

DETAILED DESCRIPTION

First Embodiment

Figure 1:
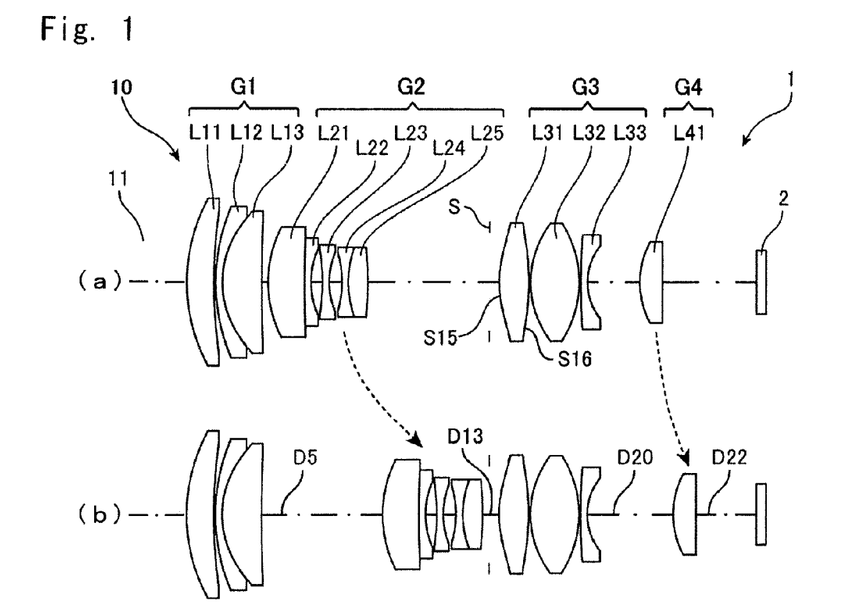
FIGS. 1A and 1B are diagrams showing the arrangements of an image pickup apparatus and a lens system, with FIG. 1A showing the arrangement at a wide-angle end and FIG. 1B showing the arrangement at a telephoto end.

The present invention will now be described in more detail with reference to the drawings. FIGS. 1A and 1B show the overall construction of an imaging apparatus that uses a lens system according to the present invention. The imaging (image pickup) apparatus 1 includes a lens system 10 and an image pickup element 2 that converts an image formed by the lens system 10 to digital data. Typical examples of the image pickup element 2 are semiconductor image pickup elements such as CCDs and CMOS. The lens system 10 is composed, in order from an object side 11 (subject side, enlarging side), of a first lens group G1 with positive refractive power, a second lens group G2 with negative refractive power, a third lens group G3 with positive refractive power, and a fourth lens group G4 with positive refractive power. FIG. 1A shows the arrangement of lenses at the wide-angle end of the lens system 10 and FIG. 1B shows the arrangement of lenses at the telephoto end of the lens system. The lens system 10 is a varifocal lens where the first lens group G1 and the third lens group G3 are fixed and the second lens group G2 and the fourth lens group G4 are moved along the optical axis to zoom between the wide-angle end and the telephoto end. Also, focusing adjustments are carried out by moving the fourth lens group G4.

One application of the imaging apparatus 1 is as an image pickup apparatus for monitoring purposes, and after the imaging apparatus 1 has been set up at an installed position, the second lens group G2 and the fourth lens group G4 are moved to manually change the zoom position and adjust the focus in keeping with the installed position and the subject being monitored. The lens system 10 has sufficient performance to form images in a wavelength range of visible light and near-infra red light (for example, wavelengths from 400 nm to 900 nm) and is therefore capable of obtaining images of the subject being monitored throughout the day and night. Also, once the zoom position and the focus of the lens system 10 have been adjusted, it is possible to obtain images of the subject being monitored throughout the day and night. Accordingly, the imaging apparatus 1 is capable of obtaining high-resolution images with no delay using a simple construction, which means that the image pickup apparatus 1 is not limited to obtaining images at a fixed monitoring point and can be used for a variety of monitoring purposes, such as a vehicle-mounted sensor. It is also possible to use the lens system 10 together with a zooming mechanism and a focus adjusting mechanism equipped with an actuator such as a motor.

Figure 2:
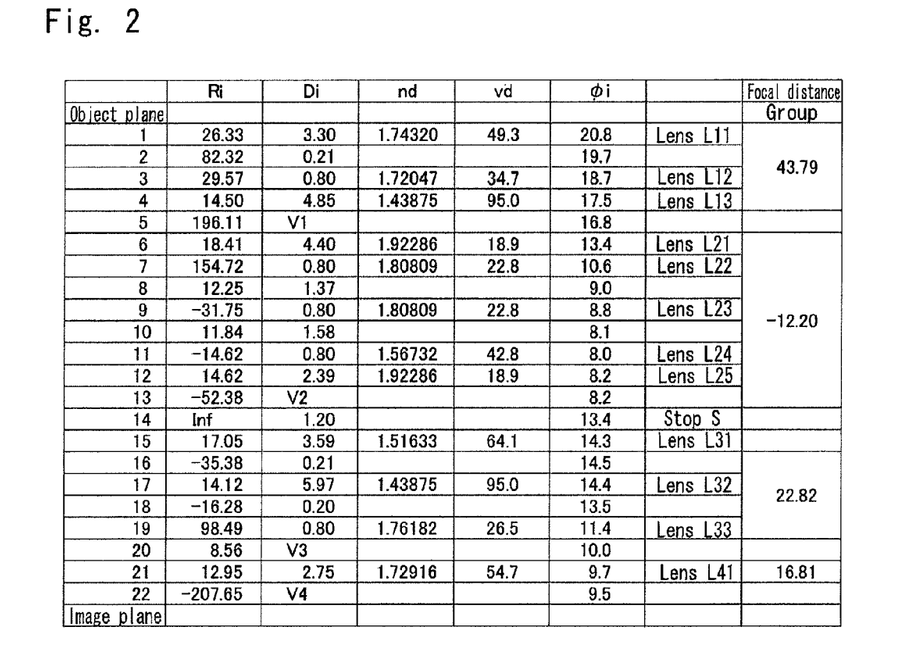
FIG. 2 is a table showing lens data of the lens system shown in FIG. 1.
Figure 3:
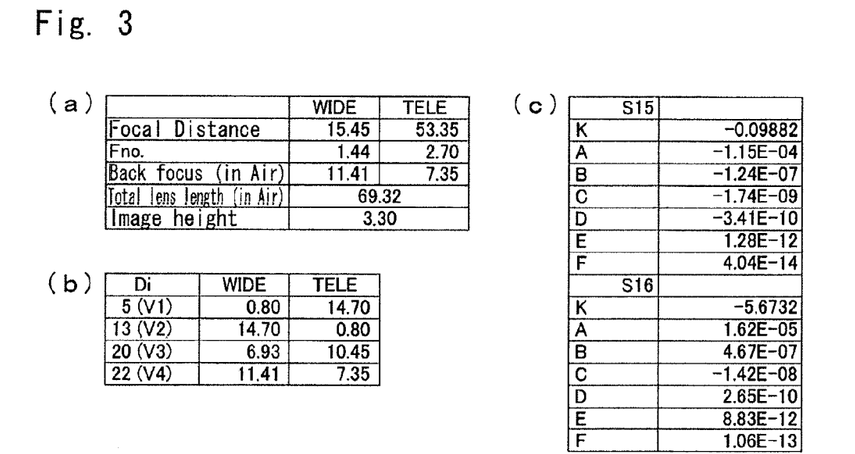
FIG. 3A to FIG. 3C are tables showing various numerical values for the lens system shown in FIG. 1, with FIG. 3A showing basic data, FIG. 3B showing zoom data, and FIG. 3C showing data on aspherical surfaces.

FIG. 2 shows data on the respective lenses. FIG. 3 shows various numerical values for the lens system. In the lens data, "Ri" represents the radius of curvature (mm) of each lens (i.e., each lens surface) disposed in order from the object side 11, "Di" represents the distance (mm) between the respective lens surfaces disposed in order from the object side 11, "φi" represents the effective diameter (mm) of each lens surface disposed in order from the object side 11, "nd" represents the refractive index (d line) of each lens in order from the object side 11, and "vd" represents the Abbe number (d line) of each lens in order from the object side 11. Note that the $22^{nd}$ data shows the distance to the image plane of the image pickup element 2.

The lens system 10 is composed of a total of twelve lenses that are numbered L11 to L13, L21 to L25, L31 to L33, and L41 and grouped into the four lens groups G1, G2, G3, and G4 from the object side 11 (enlarging side) to the image pickup element 2 side (reducing side).

The first lens group G1 that is closest to the object side 11 is a lens group with an overall positive refractive power and in order from the object side 11 is composed of a positive meniscus lens L11 that is convex on the object side 11, a negative meniscus lens L12 that is convex on the object side 11, and a positive meniscus lens L13 that is convex on the object side 11. The meniscus lenses L12 and L13 construct a cemented lens (balsam lens).

The second lens group G2 is a lens group with an overall negative refractive power and in order from the object side 11 is composed of a positive meniscus lens L21 that is convex on the object side 11, a negative meniscus lens L22 that is convex on the object side 11, a negative lens L23 that is biconcave, another negative lens L24 that is biconcave, and a positive lens L25 that is biconvex. The meniscus lenses L21 and L22, and the negative lens L24 and the positive lens L25 respectively construct cemented lenses (balsam lenses).

The third lens group G3 is a lens group with an overall positive refractive power and in order from the object side 11 is composed of a positive lens L31 that is biconvex, another positive lens L32 that is biconvex, and a negative meniscus lens L33 that is convex on the object side 11. A "stop" (aperture) S is also disposed on the object side 11 of the third lens group G3.

The fourth lens group G4 is a lens group with an overall positive refractive power and is composed of a positive lens L41 that is biconvex.

With the lens system 10, zooming is carried out by moving the second lens group G2 and the fourth lens group G4, which changes the distances D5, D13, D20, and D22. Both surfaces S15 and S16 of the positive lens L31 that is closest to the object side 11 in the third lens group G3 are aspherical. The aspherical surfaces are expressed by the following expression using the coefficients K, A, B, C, D, E, and F shown in FIG. 3C with X as the coordinate in the optical axis direction, Y as the coordinate in a direction perpendicular to the optical axis, the direction in which light propagates as positive, and R as the paraxial radius of curvature. This is also the case for the embodiment described later.

$$X=(1/R)Y^2/[1+\{1-(1+K)(1/R)^2Y^2\}^{1/2}]+AY^4+BY^6+CY^8+DY^{10}+EY^{12}FY^{14}$$

The first lens group G1 includes the lens L13 that has positive refractive power and whose Abbe number (vd1x, in this case vd13) is 95. The positive lens L13 constructs a cemented lens together with the lens L12 that has negative refractive power and an Abbe number of 34.7. As one example, the lens L13 is a lens that uses S-FPL53, an ED lens material made by OHARA INC. Accordingly, the lens system 10 satisfies Conditions (1) and (6) stated earlier. Note that although the upper limit of the Abbe number (vd1x, in this case vd13) is given as around 95 in consideration to the Abbe numbers of lens materials currently on sale, the lens L13 may have an even higher Abbe number.

The respective Abbe numbers of the lenses L21 to L25 of the second lens group G2 are 18.9, 22.8, 22.8, 42.8, and 18.9, and the second lens group G2 includes the lenses L21 and L25 with positive refractive power whose Abbe numbers (vd2x, in this case vd21 and/or vd25) are no greater than 23 and the lenses L22 and L23 with negative refractive power and whose Abbe numbers (vd2y and vd2z, in this case vd22 and vd23) are no greater than 23. The lenses L21 and L22 construct a cemented lens. Accordingly, the lens system 10 satisfies Condition (2) stated earlier. Note that the lower limit of the Abbe numbers (vd2x, vd2y, vd2z, in this case vd21, vd22, vd23 and vd25) are given as around 17 in consideration to the Abbe numbers of lens materials currently on sale.

The respective Abbe numbers of the positive lenses L31 and L32 of the third lens group G3 are 64.1 and 95.0. Accordingly, the average (vd3a) of the Abbe numbers of the positive lenses of the third lens group G3 is 79.6, which satisfies Condition (3) stated earlier.

The positive lens L31 of the third lens group G3 is a lens that uses the lens material "L-BSL7" made by OHARA INC. and has a thermo-optic coefficient ndt (or relative refractive index temperature variation coefficient dn/dt (relative)) for Fraunhofer d line (given in units of /° C., hereinafter the same)) of $4.7 \times 10^{-6}$ in a temperature range of 40 to 60° C. The positive lens L32 is a lens that uses the lens material "L-FPLL53" made by OHARA INC. and has a thermo-optic coefficient ndt (d line) of $-7.0 \times 10^{-6}$ in a temperature range of 40 to 60° C. Accordingly, the sum ndts of the thermo-optic coefficients of the positive lenses in the third lens group G3 is −2.3×10⁻⁶, which satisfies Conditions (4) and (5) stated earlier.

The lens system 10 is a varifocal lens with a zoom ratio of 3.45 where the focal distance is variable in a range of 15.45 to 53.35 mm, and the sensor (image pickup element) 2 used is ⅓ inch in size. Accordingly, when converted to 35 mm film image size, the lens system 10 is a varifocal lens with a focal distance range of 108 mm to 380 mm which makes it mainly a telephoto lens.

Figure 4:
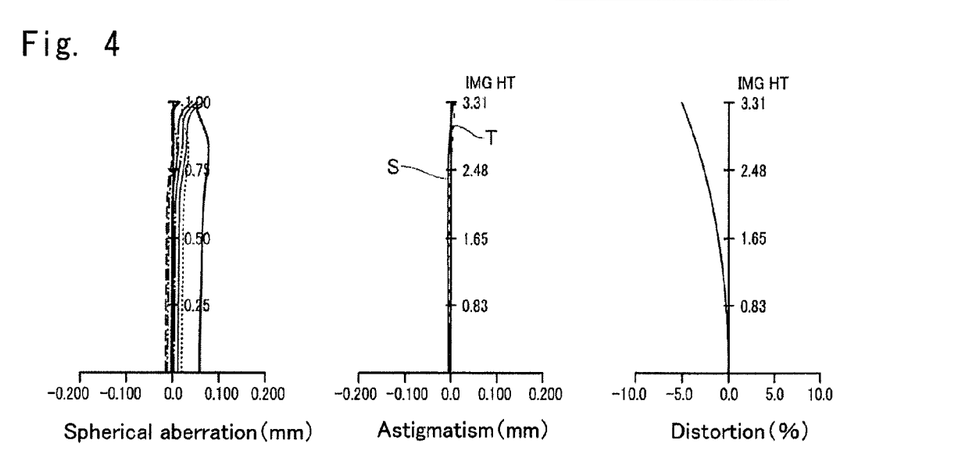
FIG. 4 is a series of graphs showing longitudinal aberration at the wide-angle end of the lens system.
Figure 5:
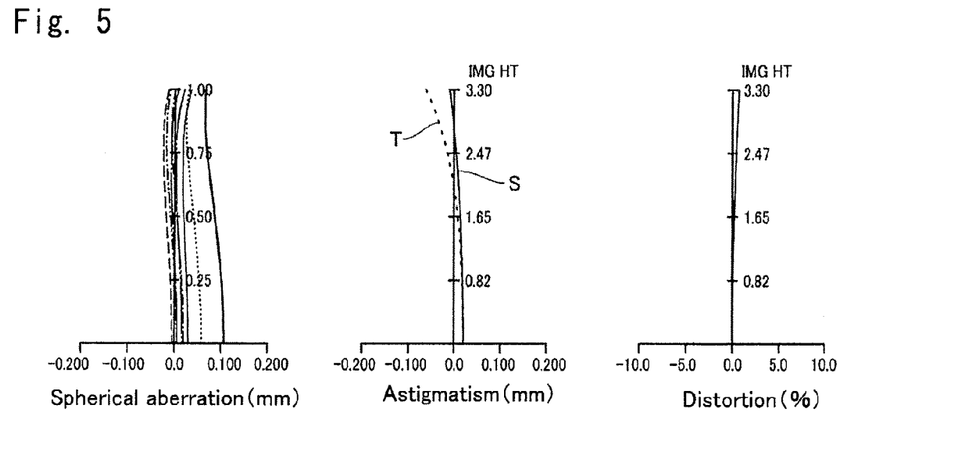
FIG. 5 is a series of graphs showing longitudinal aberration at the telephoto end of the lens system.

In addition, as shown in the longitudinal aberration graphs at the wide-angle end and the telephoto end in FIGS. 4 and 5, various aberrations are favorably corrected for both visible light and near-infra red light, which means that it is possible to obtain sharp images of visible light and near-infra red light at both the wide-angle end and the telephoto end. Note that spherical aberration is shown for the respective wavelengths of 435.83 nm (thick solid line), 486.13 nm (dash line), 546.07 nm (dot-dash line), 587.56 nm (dot-dot-dash line), 656.27 nm (long dash line), 800.00 nm (dot-long dash line), 850.00 nm (dot-dot-long dash line), and 900.00 nm (thin solid line). In the graphs showing astigmatism, aberration for tangential rays (T) and sagittal rays (S) are respectively shown.

In the lens system 10, in the first lens group G1 that has positive refractive power, by using a lens with low dispersion, that is, the high Abbe number vd1$x$ as the positive lens L13, the production of chromatic aberration is suppressed, and by combining the positive lens L13 that has the high Abbe number vd1$x$ with the lens L12 with negative refractive power that is relatively low Abbe number, it is possible to effectively correct axial chromatic aberration.

In the second lens group G2 that has negative refractive power and has a zoom function, by using lenses with a low Abbe number vd2$x$, vd2$y$, vd2$z$, the respective lenses L21 to L25 that construct the second lens group G2 can be provided with sufficient refractive power to achieve zooming and to correct the production of various aberrations that accompany the zooming. Also, by using lenses with high dispersion and constructing two cemented lenses from L21, L22 and L24, L25 out of the lenses L21 to L25, it is possible to achieve sufficient performance to correct not only axial chromatic aberration but also chromatic aberration produced by the respective lens groups.

The third lens group G3 that has positive power is constructed so as to include the lenses L31 and L32 that are a plurality of lenses with low dispersion (i.e., high average Abbe number vd3$a$) and have positive refractive power, which achieves positive refractive power while suppressing the production of chromatic aberration. In addition, by making the thermo-optic coefficient negative, fluctuations in power due to the temperature of the lens system 10 are suppressed.

The thermo-optic coefficients of optical materials that are normally selected are positive (plus), so that by combining the lens group G1 and/or G4 that have positive refractive power with the lens group G2 that has negative refractive power, temperature-based variations in the refractive index of the lens system 10 as a whole are canceled out to an extent. However, it cannot be said that temperature variations in axial chromatic aberration are suppressed to within a specified range over a wide range of wavelengths. In particular, in applications, such as outdoor use, where high temperatures of 40° C. and above are expected, there is the risk of a wide range of temperature variation at the setup position.

In the lens system 10, by using the four groups G1 to G4 that are positive, negative, positive, and positive and making the sum ndts of the thermo-optical coefficients in the third lens group G3 negative, it is possible to further suppress the thermo-optical coefficient of the lens system 10 through the use of a combination of positive and negative powers (for example, the first lens group G1 and the second lens group G2) and a combination of positive and negative thermo-optical coefficients for groups with positive refractive power (for example, the third lens group G3 and the fourth lens group G4). Accordingly, it is possible to suppress focusing fluctuations due to changes in environmental temperature where the lens system 10 is installed, and therefore possible to correct axial chromatic aberration due to such fluctuations even more accurately. This means that with the image pickup apparatus 1, even if an autofocus mechanism or a motorized focusing mechanism is omitted, it is still possible to obtain sharp images produced by visible light and near-infra red light.

In addition, in the third lens group G3, two positive lenses L31 and L32 that have low dispersion (high average Abbe number vd3$a$) are used, which suppresses the production of chromatic aberration. In addition, the third lens group G3 uses lenses with high Abbe numbers and comparatively low refractive power, and is a lens group with a negative thermo-optical coefficient that is provided with sufficient refractive power to contribute to correcting temperature variations in the refractive index of the lens system 10.

Low-dispersion (i.e., high Abbe number) optical materials that go by the names of "ED glass", "SD glass", "LD glass", "UD glass", and the like and exhibit anomalous dispersion include materials that have large, negative thermo-optical coefficients. S-FPL53, S-FSL5 made by OHARA INC., FCD1, FCD10 made by HOYA CORPORATION, K-GFK68, K-GFK70, K-PFK85 made by SUMITA OPTICAL GLASS, INC. can be given as examples of such materials. Accordingly, by constructing the third lens group G3 so as to include a plurality of positive lenses with high Abbe numbers, there is the effect of correcting chromatic aberration due to the low dispersion, with it also being possible to design the group as a lens group with a negative thermo-optical coefficient and an appropriate positive refractive power. In addition, by using a plurality of lenses, it is possible to improve the aberration correction performance of the third lens group G3.

Although using low dispersion (i.e., high average Abbe number vd3$a$) in the range shown in Condition (3) alone as a selection criterion for the lenses in the third lens group G3 is effective in correcting chromatic aberration, there is the risk that the negative thermo-optical coefficient will be too large, resulting in the risk of excessive correction. Low-dispersion (i.e., high Abbe number) optical materials that exhibit anomalous dispersion also include materials with positive thermo-optical coefficients. L-BAL35, L-BSL7 made by OHARA INC., M-PCD51 made by HOYA CORPORATION, and K-PFK30 made by SUMITA OPTICAL GLASS, INC. can be given as examples. Accordingly, by combining the positive lens L32 that has a high Abbe number and a negative thermo-optical coefficient and a positive lens L31 that has a high Abbe number and a positive thermo-optical coefficient in the third lens group G3, a third lens group G3 that has a negative thermo-optical coefficient in the appropriate range shown in Conditions (4) or (5) and also has a certain degree of refractive power is constructed. The combination of the positive lenses L31 and L32 that have high Abbe numbers and the lens L33 that has negative refractive power and a low Abbe number is also effective in correcting chromatic aberration.

In this way, the present lens system 10 is a varifocal telephoto-type lens system where chromatic aberration, and in particular axial chromatic aberration that needs to be corrected in a telephoto-type lens, is corrected extremely favorably across a wide range of wavelengths. Since it is possible to suppress focusing errors without increasing the depth of focus, it is possible to produce a bright lens system with a low F number of 1.44 at the wide-angle end. Accordingly, it is possible to provide a lens system 10 that is capable of obtaining bright, sharp images in a wide range of wavelengths.

In addition, in the lens system 10, since the first to third lens groups G1 to G3 are designed to correct the chromatic aberration that accompanies zooming or variations in temperature, the fourth lens group G4 can be constructed of only the positive lens L41 that has a high refractive index and an intermediate Abbe number. Accordingly, the construction of the lens group that moves to adjust the focus after zooming can be simplified. In addition, although the lens system 10 is suited to applications where the zoom position and the focus are fixed, as another example the lens system 10 is also suited to a system where images are obtained day and night by moving the fourth lens group G4 with an autofocus mechanism after zooming.

Second Embodiment

Figure 6:
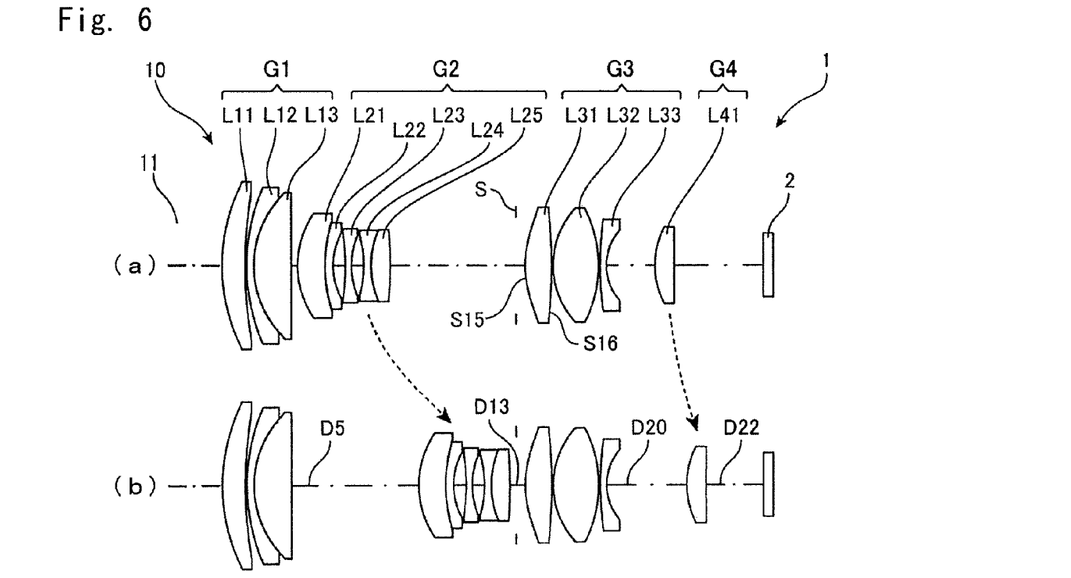
FIGS. 6A and 6B are diagrams showing the arrangements of a different image pickup apparatus and lens system, with FIG. 6A showing the arrangement at a wide-angle end and FIG. 6B showing the arrangement at a telephoto end.

FIG. 6 shows the overall construction of an imaging apparatus that uses a different lens system according to the present invention. This imaging apparatus 1 also includes a lens system 10 constructed of four groups with positive, negative, positive, and positive power, and the image pickup element 2 that converts the image formed by the lens system 10 to digital data. FIG. 6A shows the arrangement of lenses at the wide-angle end of the lens system 10 and FIG. 6B shows the arrangement of lenses at the telephoto end of the lens system 10. The lens system 10 is also a varifocal lens where the first lens group G1 and the third lens group G3 that have positive refractive power are fixed and the second lens group G2 that has negative refractive power and the fourth lens group G4 that has positive refractive power are moved along the optical axis to change the magnification (i.e., zoom) between the wide-angle end and the telephoto end. Also, focusing adjustments are carried out by moving the fourth lens group G4.

Figure 7:
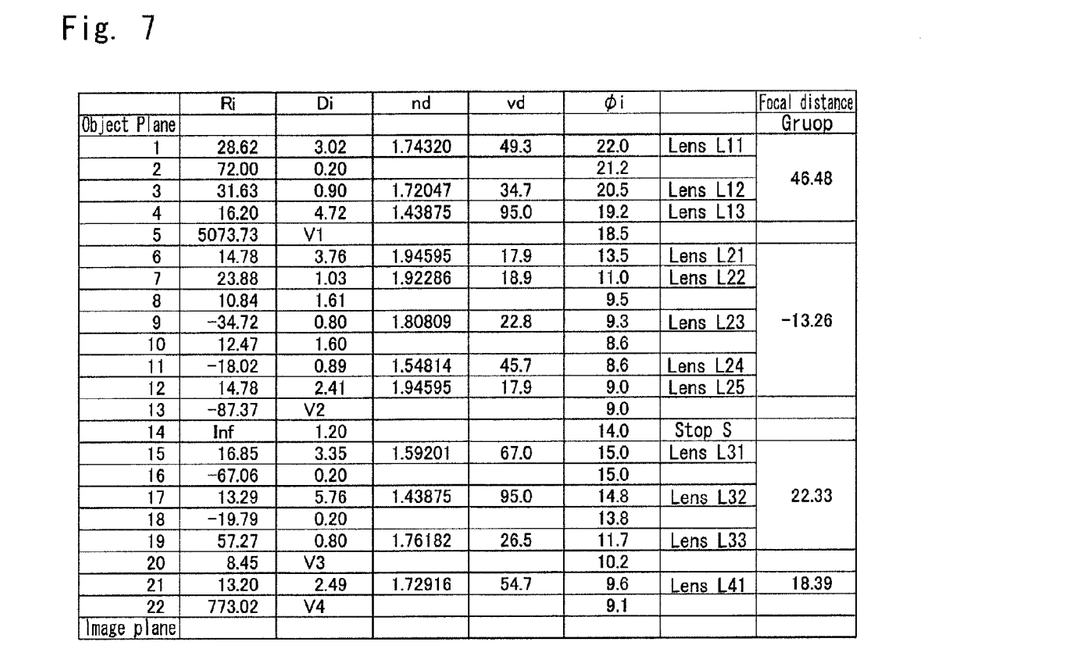
FIG. 7 is a table showing lens data of the lens system shown in FIG. 6.
Figure 8:
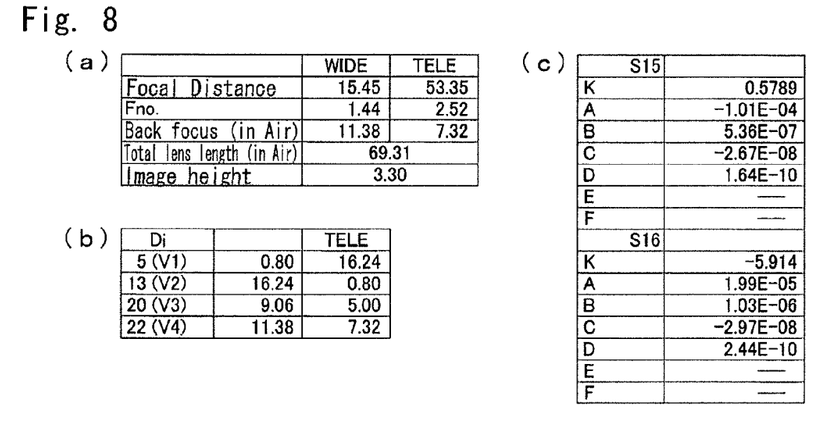
FIG. 8A to FIG. 8C are tables showing various numerical values for the lens system shown in FIG. 6, with FIG. 8A showing basic data, FIG. 8B showing zoom data, and FIG. 8C showing data on aspherical surfaces.

FIG. 7 shows data on the respective lenses. FIG. 8 shows various numerical values for the lens system. The lens system 10 is composed of a total of twelve lenses that are numbered L11 to L13, L21 to L25, L31 to L33, and L41 and grouped into the four groups G1, G2, G3, and G4 from the object side (subject side, enlarging side) 11 to the image pickup element (reducing side) 2. Aside from the lens L41 of the fourth lens group G4 being a positive meniscus lens that is convex on the object side 11, the forms of the respective lenses are the same as in the lens system of the first embodiment. Accordingly, detailed description thereof is omitted.

The first lens group G1 of the lens system 10 also includes the lens L13 that has positive refractive power and an Abbe number (vd1$x$, in this case vd13) of 95, with the lens L13 constructing a cemented lens together with the lens L12 that has negative refractive power and an Abbe number of 34.7. As one example, the lens L13 uses S-FPL53 that is an ED lens material made by OHARA, INC. Accordingly, the lens system 10 satisfies Conditions (1) and (6) stated earlier.

The respective Abbe numbers of the lenses L21 to L25 of the second lens group G2 are 17.9, 18.9, 22.8, 45.7, and 17.9, which means that the second lens group G2 includes the positive lenses L21 and L25 whose Abbe numbers (vd2$x$, in this case vd21 and/or vd25) are no greater than 23 and the negative lenses L22 and L23 whose Abbe numbers (vd2$y$ and vd2$z$, in this case vd22 and vd23) are no greater than 23. The lenses L21 and L22 construct a cemented lens. Accordingly, the lens system 10 satisfies Condition (2) stated earlier.

The respective Abbe numbers of the positive lenses L31 and L32 of the third lens group G3 are 67.0 and 95.0. Accordingly, the average of the Abbe numbers (vd3$a$) of the positive lenses in the third lens group G3 is 81.0, which satisfies Condition (3) stated earlier. Note that both surfaces S15 and S16 of the positive lens L31 are aspherical.

The positive lens L31 of the third lens group G3 is a lens that uses the lens material "M-PCD51" made by HOYA CORPORATION and has a thermo-optical coefficient ndt (dn/dt (relative) for d line (in units of /° C.)) of $0.7 \times 10^{-6}$ in a temperature range of 40 to 60° C. The positive lens L32 is a lens that uses the lens material "L-FPLL53" made by OHARA INC. and has a refractive index temperature coefficient ndt (d line) of $-7.0 \times 10^{-6}$ in a temperature range of 40 to 60° C. Accordingly, the sum ndts of the thermo-optical coefficients of the positive lenses L31 and L32 in the third lens group G3 is $-6.3 \times 10^{-6}$, which satisfies Conditions (4) and (5) stated earlier.

Figure 9:
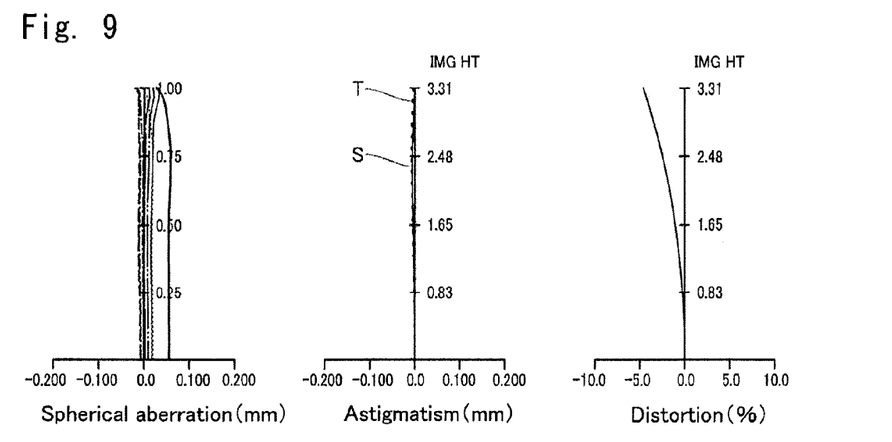
FIG. 9 is a series of graphs showing longitudinal aberration at the wide-angle end of the lens system shown in FIG. 6.
Figure 10:
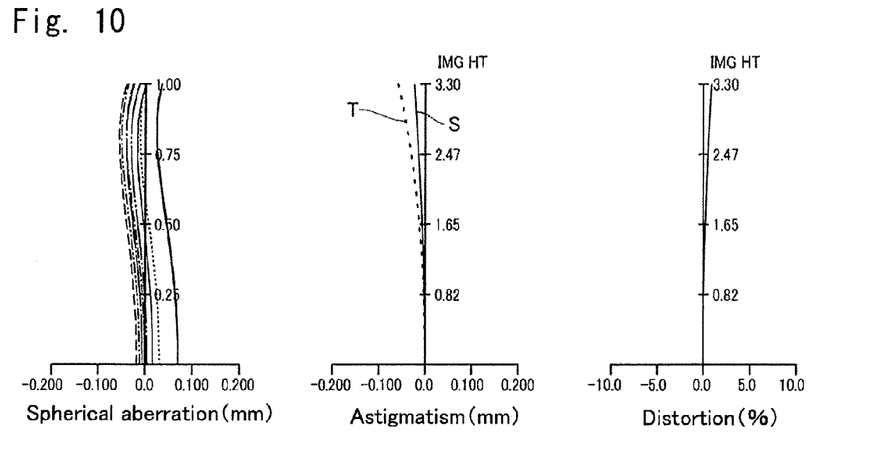
FIG. 10 is a series of graphs showing longitudinal aberration at the telephoto end of the lens system shown in FIG. 6.

The lens system 10 is also a varifocal lens with a zoom ratio of 3.45 where the focal distance is variable in a range of 15.45 to 53.35 mm. Accordingly, when converted to 35 mm film image size, the lens system 10 is a varifocal lens with a focal distance range of 108 mm to 380 mm which makes it mainly a telephoto lens. In addition, as shown in the longitudinal aberration graphs at the wide angle end and the telephoto end in FIGS. 9 and 10, various aberrations are favorably corrected for both visible light and near-infra red light, which means that it is possible to obtain sharp images of visible light and near-infra red light at both the wide-angle end and the telephoto end.

The present lens system 10 is also a varifocal telephoto-type lens system where chromatic aberration, and in particular axial chromatic aberration that needs to be corrected in a telephoto-type lens, is corrected extremely favorably across a wide range of wavelengths. In this way, according to the present invention, it is possible to provide a lens system 10 that is a telephoto varifocal lens that has a low F number, has little axial chromatic aberration and high resolution across the entire zoom range from the visible light range to the near-infra red range, and has little fluctuation in focus due to variations in environmental temperature.

This means that by using the lens system 10, it is possible to provide an image pickup apparatus 1 that is capable of obtaining bright, sharp images across a wide range of wavelengths and is suited to monitoring purposes in day and night applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens system comprising, in order from an object side:
a first lens group with positive refractive power;
a second lens group with negative refractive power that moves during zooming;
a third lens group with positive refractive power; and
a fourth lens group with positive refractive power that moves during zooming and focusing adjustments,
wherein the first lens group includes a lens with positive refractive power and an Abbe number vd1$x$ that satisfies a following condition,
the second lens group includes a lens with positive refractive power and an Abbe number vd2$x$ and two lenses with negative refractive power and Abbe numbers $vd2y$ and $vd2z$ respectively, the Abbe numbers $Vd2x$, $Vd2y$ and $Vd2z$ satisfying following conditions, and the third lens group includes a plurality of lenses with positive refractive power, an average $vd3a$ of the Abbe numbers of the plurality of lenses with positive refractive power satisfies a following condition, and a sum ndts of thermo-optical coefficients of the plurality of lenses with positive refractive power in a temperature range of 40° C. to 60° C. satisfies a following condition, $vd1x > 80$ $vd2x, vd2y, vd2z < 23$ $77.5 < vd3a < 82.5$ $-12.8 \times 10^{-6} < ndts < -2.4 \times 10^{-6}$.

2. The lens system according to claim 1,
wherein the sum ndts of the thermo-optical coefficients of the plurality of lenses with positive refractive power in the third lens group satisfies a condition whereby $-8.6 \times 10^{-6} < ndts < -2.4 \times 10^{-6}$.

3. The lens system according to claim 1,
wherein the plurality of lenses with positive refractive power in the third lens group include lenses with both positive and negative thermo-optical coefficients.

4. The lens system according to claim 1,
wherein the third lens group consists of two lenses with positive refractive power and one lens with negative refractive power.

5. The lens system according to claim 1,
wherein the second lens group includes a cemented lens that includes the lens with positive refractive power and one of the two lenses with negative refractive power.

6. The lens system according to claim 1,
wherein the Abbe number $vd1x$ satisfies a condition whereby $vd1x > 90$.

7. The lens system according to claim 1,
wherein the first lens group includes a cemented lens includes the lens with positive refractive power and a lens with negative refractive power.

8. The lens system according to claim 1,
wherein the fourth lens group consists of a single lens with positive refractive power.

9. An imaging apparatus comprising:
a lens system according to claim 1; and
an image pickup element.

10. The lens system according to claim 1,
wherein the lens system consists of the first lens group, the second lens group, the third lens group and the fourth lens group.

* * * * *